(12) United States Patent
Wingerath (10) Patent No.: US 12,000,535 B2
(45) Date of Patent: Jun. 4, 2024

(54) ELECTRONIC STEAM TRAP

(71) Applicant: VELAN INC., Montreal (CA)

(72) Inventor: Christian Matthias Wingerath, Düsseldorf (DE)

(73) Assignee: VELAN INC., Quebec (CA)

(*) Notice: Subject to any disclaimer, the term of this patent is extended or adjusted under 35 U.S.C. 154(b) by 792 days.

(21) Appl. No.: 17/046,170

(22) PCT Filed: Apr. 3, 2019

(86) PCT No.: PCT/IB2019/052723
§ 371 (c)(1),
(2) Date: Oct. 8, 2020

(87) PCT Pub. No.: WO2019/197945
PCT Pub. Date: Oct. 17, 2019

(65) Prior Publication Data
US 2021/0033245 A1    Feb. 4, 2021

Related U.S. Application Data

(60) Provisional application No. 62/654,727, filed on Apr. 9, 2018.

(51) Int. Cl.
*F01D 17/08*    (2006.01)
*F16T 1/48*    (2006.01)
(52) U.S. Cl.
CPC .............. *F16T 1/48* (2013.01); *F01D 17/08* (2013.01)
(58) Field of Classification Search
CPC .................................. F16T 1/48; F01D 17/08
See application file for complete search history.

(56) References Cited

U.S. PATENT DOCUMENTS

| 4,197,990 A | 4/1980 | Carberg et al. |
| 6,279,593 B1* | 8/2001 | Sheppard ............. F16T 1/00 137/181 |
| 7,664,610 B2 | 2/2010 | Anderson et al. |

(Continued)

FOREIGN PATENT DOCUMENTS

| GB | 2 231 407 | 11/1990 |
| GB | 2 483 293 | 3/2012 |

(Continued)

OTHER PUBLICATIONS

Hagihara, Process System Configuration . . . , 2013, Full Document (Year: 2013).*

(Continued)

*Primary Examiner* — Nael N Babaa
(74) *Attorney, Agent, or Firm* — Nixon & Vanderhye, PC (57) ABSTRACT

A self-contained electronic steam trap drains condensate from a steam system. The steam trap includes a drain pipe adapted for fluid communication with a steam supply system. Pressure and temperature sensors measure pressure and temperature in an internal passageway of the steam trap. A condensate discharge valve is disposed at or upstream of an output port of the drain pipe. The condensate discharge valve is controlled based on the measured pressure and temperature and a calculated steam saturation temperature. Both a cycling mode and a regulation mode of automatic valve operation are described.

18 Claims, 7 Drawing Sheets

(56) References Cited

U.S. PATENT DOCUMENTS

| | | | |
|---|---|---|---|
| 8,050,875 B2 | 11/2011 | Karschnia | |
| 8,188,359 B2 | 5/2012 | Chakraborty | |
| 8,739,808 B2 | 6/2014 | Aloni et al. | |
| 9,184,364 B2 | 11/2015 | Chakraborty et al. | |
| 9,494,280 B2 | 11/2016 | Schlensker | |
| 2010/0294377 A1* | 11/2010 | Aloni | A61L 2/07 137/14 |
| 2017/0178961 A1* | 6/2017 | Ryu | C23C 16/45525 |
| 2017/0363312 A1* | 12/2017 | Crimins | F24F 11/66 |
| 2018/0038512 A1* | 2/2018 | Mitsu | F16K 31/508 |
| 2019/0032848 A1* | 1/2019 | Miller | F01K 25/08 |
| 2020/0004209 A1* | 1/2020 | Gueissaz | G04G 19/00 |

FOREIGN PATENT DOCUMENTS

| | | | |
|---|---|---|---|
| GB | 2 483 369 | | 3/2012 |
| JP | 2003-130289 | | 5/2003 |
| JP | 2005299866 A | * | 10/2005 |
| JP | 2016005376 A | * | 1/2016 |
| WO | WO-2015098363 A1 | * | 7/2015 ............. G01C 21/20 |

OTHER PUBLICATIONS

Maruta, Steam Trap, 2004, Full Document (Year: 2004).*
Uzaki, Process system component operation state provision apparatus, 2014, Full Document (Year: 2014).*
International Search Report for PCT/IB2019/052723 dated Jun. 25, 2019, 3 pages.
Written Opinion of the ISA for PCT/IB2019/052723 dated Jun. 25, 2019, 5 pages.

* cited by examiner

ELECTRONIC STEAM TRAP

CROSS REFERENCE TO RELATED APPLICATIONS

This application is the U.S. national phase of International Application No. PCT/IB2019/052723 filed Apr. 3, 2019 which designated the U.S. and claims the benefit of U.S. Provisional Application Ser. No. 62/654,727, filed Apr. 9, 2018, the entire contents of each of which are hereby incorporated herein by reference.

TECHNICAL FIELD

The present technology relates generally to devices used to remove condensate from steam/gas lines, and more particularly to electronic steam trap systems.

BACKGROUND

Steam is used to transport energy—typically in a system that maintains substantially constant steam temperature and pressure. When energy is removed from the steam, condensate forms and it no longer contains as much energy and it varies in temperature as compared to saturated steam with constant temperature and constant pressure. Condensate is drained from the steam system during steam transportation and after every process where energy is removed from the steam. The drained condensate is usually collected and returned to the boiler.

Steam traps have been long used in steam supply conduits and in steam operated equipment to prevent build-up of condensate formed by condensation of steam. The goal of these steam traps is to drain condensate as well as to discharge air and non-condensable gases without permitting much if any steam to escape. Steam traps typically are located, after a main steam supply header, throughout a steam supply system. Discharged condensate typically passes through a condensate return line to be collected and directed back to a steam generating source such as a boiler to repeat the water-to-steam process. Removing condensate helps reduce "knocking" events in steam lines and the like to help reduce damage to steam lines, steam turbines, steam pistons and other equipment that is operated and/or powered by energy contained within the steam.

An early universal steam trap was described by A. Karel Velan in U.S. Pat. No. 2,629,553 issued Feb. 24, 1953 wherein a bimetallic heat and pressure responsive member deflected to open/close a condensate outlet passage valve according to a curve substantially equal to the normal saturated steam curve plotting temperature and pressure along a line separating liquid and gas (i.e., steam) phases of water (i.e., the well-known steam saturation curve).

A later electronic drain system was described by Carberg et al. in U.S. Pat. No. 4,197,990 issued Apr. 15, 1980. Pressure at one remote point in a steam header was measured and temperatures in each of plural distant condensate drain pots was measured. An electronic circuit converted the measured remote steam header pressure into a steam saturation temperature. At each distant drain pot, the remote header steam saturation temperature was compared with that drain pot's temperature to control opening and closing of a condensate drain valve at that drain pot. If sensed drain pot temperature exceeded the remote header saturation steam temperature by a predetermined amount (e.g. 100° F.), the drain valve was closed. If the sensed drain pot temperature exceeded the remote header saturation steam temperature by a lesser predetermined amount (e.g., 50° F.), the drain valve was opened.

Other types of steam traps have been used as well. For example, in addition to steam traps having discharge valves controlled based on thermostatically deforming operating elements (e.g., bi-metal arrangements, imbalances between applied forces, etc.), mechanical steam traps using floats or other mechanical or ultrasonic sensors to sense the presence of steam and/or condensate have been used. Thermodynamic steam trap valves actuated by fluid dynamics have also been used.

SUMMARY

An example embodiment of an electronic self-contained steam trap structure measures temperature and pressure internally, downstream from an inlet port. A currently permitted sub-cooling temperature (i.e., a predetermined incremental temperature value—possibly input by an operator) below the saturated steam temperature calculated from the measured steam trap pressure is compared to the measured steam trap temperature to control a condensate drain valve at an outlet of an internal passage downstream of the internal temperature and pressure measurement.

In a cycling mode, the steam trap condensate discharge valve is opened at (and below) the sub-cooling temperature and closed at (or typically a bit below) the calculated steam trap saturation temperature. A valve closing temperature a bit below (e.g., 5° C.) the calculated steam trap saturation temperature can help avoid undesirable loss of steam. Thus, in a cycling mode, condensate is periodically trapped and contained within the steam trap structure and discharged.

In a continuous regulation mode, the condensate discharge valve is regulated to that degree of opening which maintains a regulated flow of condensate which occurs while holding the sub-cooling temperature substantially constant. As will be understood, in a continuous regulation mode, the steam trap does not actually trap condensate but, instead, regulates its rate of continuous discharge from the trap structure.

An example embodiment of an automated electronic steam trap structure has an internal passageway connected to an inlet port configured to receive steam/condensate and an outlet port configured to discharge condensate collected by the steam trap. An electro-mechanically actuated condensate discharge valve is disposed upstream of the outlet port and vents condensate from the steam trap when actuated to an open position. Pressure and temperature sensors are disposed to monitor pressure and temperature conditions in the internal passageway upstream of the condensate discharge valve and downstream of the inlet port. A thermoelectric generator (TEG) power source is disposed in thermal contact with the steam trap and configured to generate electrical power from heat energy of steam/condensate passing into said inlet port. An electronic control and sensor signal processing circuit is, at least in part, electrically powered by the TEG power source (which, e.g., maintains an energy storage battery or energy storage capacitor in an electrically charged state). The electronic control and sensor signal processing circuit is connected to automatically actuate the electro-mechanically driven valve in response to inputs from the steam trap's own pressure and temperature sensors based on well-known predetermined steam saturation curve data related to temperatures and pressures at which steam in a gas phase condenses to condensate water in a liquid phase.

Another aspect of the disclosed technology relates to a method practiced by the example electronic steam trap structure. This method for draining condensate from a heated fluid/gas line involves use of a drain pipe configured to be in fluid communication with a heated fluid/gas line and to have an internal passageway configured to accumulate liquid condensate therein. Pressure is measured in an internal passageway of the drain pipe at an upstream section thereof with a pressure sensor that is in fluid communication with the drain pipe. Saturation temperature of the liquid is calculated based on the measured pressure. Temperature in the internal passageway of the drain pipe is measured with a temperature sensor also disposed at an upstream section of the drain pipe. A condensate discharge valve installed at a downstream section of the drain pipe is moved between (a) at least one open position in which the valve opens the internal passageway of the drain pipe to allow fluid to flow past the valve and (b) a closed position in which the valve closes the internal passageway of the drain pipe so as to prevent fluid from flowing past the valve.

In an example cycling method mode, the valve is automatically actuated based on comparison of the calculated saturation temperature and the measured temperature such that a) the valve is closed if the measured temperature is equal to or above the calculated saturation temperature, and b) the valve is open if the measured temperature is below the calculated saturation temperature by a predetermined incremental sub-cooling amount.

In an example continuous regulation method mode, the degree of condensate discharge valve opening is regulated by maintaining the level of sub-cooling at the steam trap inlet substantially constant thereby resulting in a regulated out-flow of condensate from the steam trap structure.

Other aspects, features, and advantages of the disclosed technology will become apparent from the following detailed description when taken in conjunction with the accompanying drawings, which are a part of this disclosure and which illustrate, by way of example, some aspects of this invention.

BRIEF DESCRIPTION OF THE DRAWINGS

The accompanying drawings facilitate an understanding of the various embodiments of this technology. In such drawings.

DETAILED DESCRIPTION OF ILLUSTRATED EXAMPLES

The following description is provided in relation to several examples (most of which are illustrated) which may share some common characteristics and features. It is to be understood that one or more features of any one example may be combinable with one or more features of the other examples. In addition, any single feature or combination of features in any of the examples may constitute additional examples.

Figure 1:
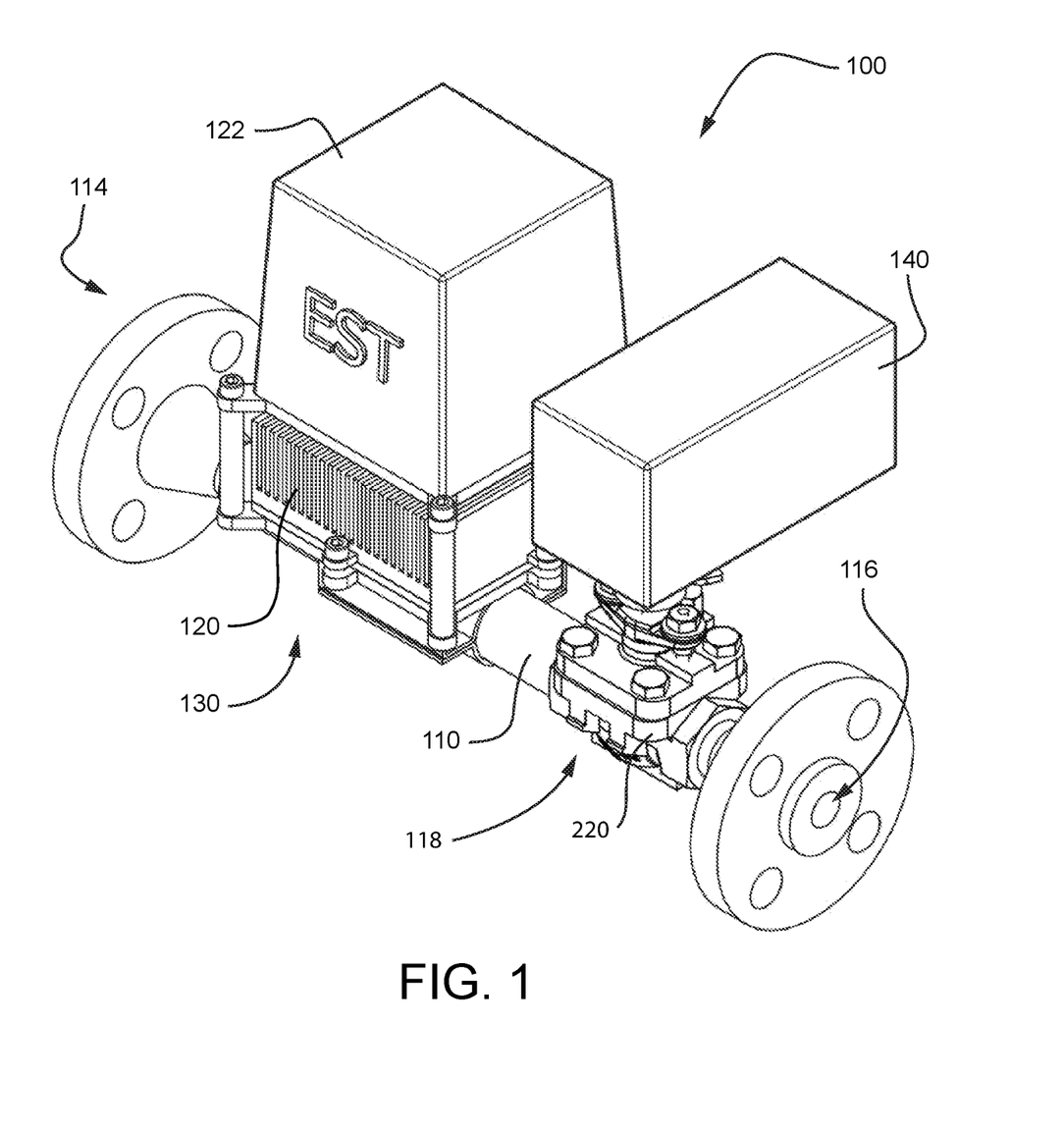
FIG. 1 is a perspective view of a steam trap system in accordance with an example of the disclosed technology.
Figure 2:
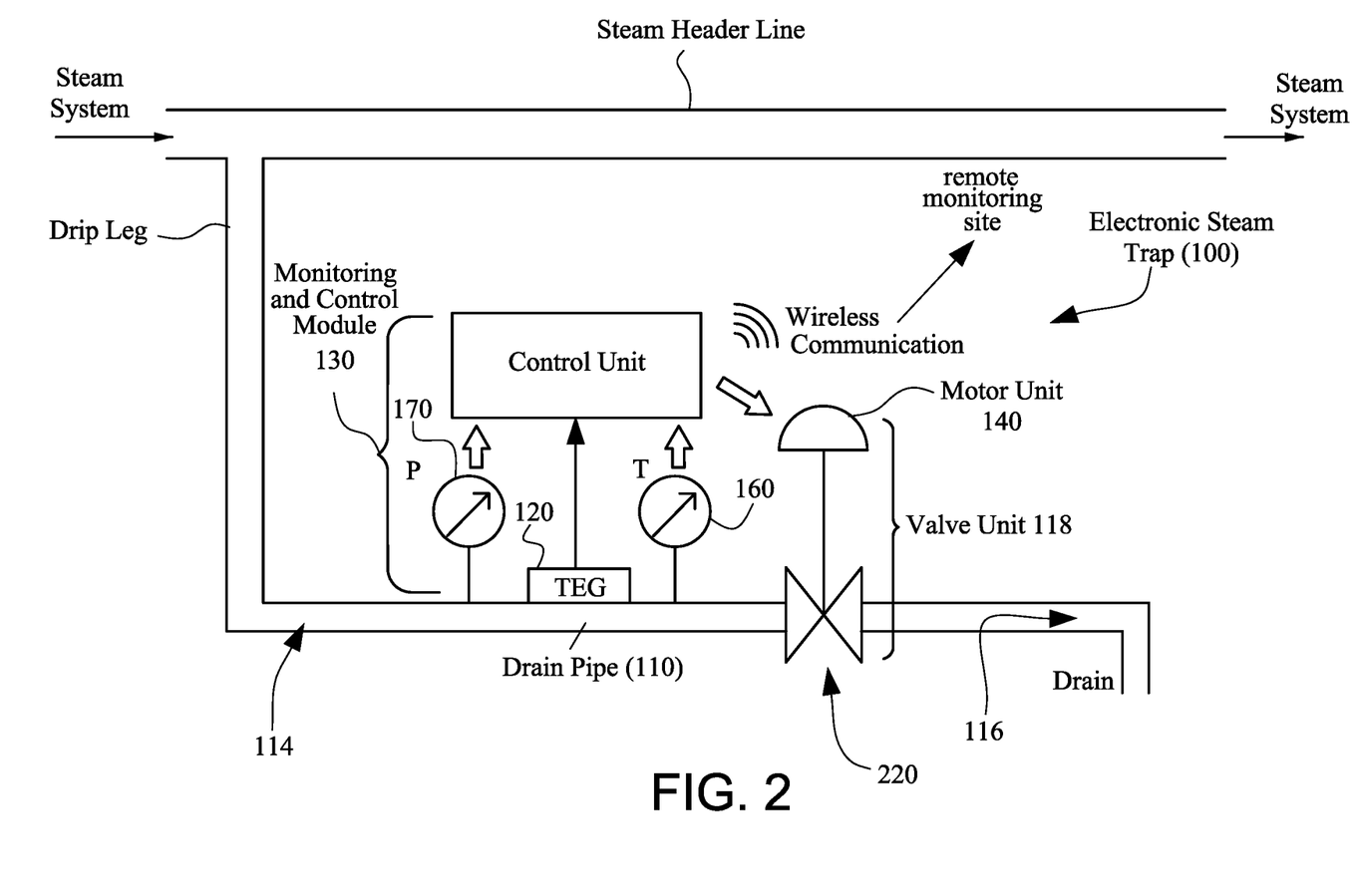
FIG. 2 is a schematic illustration of the steam trap system of FIG. 1 in a steam system.

Referring to FIG. 1, an example electronic steam trap 100 is shown. As schematically shown in FIG. 2, the electronic steam trap may be connected to a steam system header via a drip leg to drain condensate from the steam system. As will be appreciated from FIG. 1, this example steam trap can be configured to provide a self-contained self-standing module including all necessary operational components such that it can simply be installed into a drip leg and function on its own without necessary connections to other systems or components. Of course this example steam trap can also be otherwise configured if desired to interface with external power sources, sensors, etc.

In alternative examples, liquids other than water may be heated to produce heated gas other than steam which also condenses to a condensate in accordance with a predetermined saturation curve showing a boundary between liquid and gas phases of a substance other than water.

The example electronic steam trap measures temperature and pressure internally at its inlet side. The example electronic steam trap calculates the current sub-cooling valve transition value with an allowed incremental sub-cooling value subtracted from the calculated saturation temperature. The current incremental sub-cooling temperature value (e.g., 100° F. or 38° C. below the calculated saturation temperature) can be a fixed stored value or a value provided from an operator—possibly a value that can be changed by an operator). Depending on the calculated currently permitted sub-cooling temperature and the actual measured temperature, the electronic steam trap controllably actuates a ball valve at its outlet side to drain accumulated condensate.

The example electronic steam trap runs on battery power (or electrical energy stored in a capacitor electrical energy storage device) automatically re-charged as needed by an also included thermo-electric generator (TEG) utilizing a small amount of energy derived from the difference between incoming steam temperature and ambient temperature.

Additionally, the example electronic steam trap can send measured values and its operating status to a nearby or remote monitoring location via Wi-Fi or other conventional digital communication channels (e.g., wireless or wired). Preferably a global positioning satellite (GPS) module is included as well so that the geographical location of the steam trap can be included in the transmitted monitoring data.

Pressure is measured in the steam trap and an included processor module calculates the corresponding saturation temperature. This is preferably accomplished in substantially continuously repeated fashion so that the current saturation temperature is always available. Of course it could also be done only when a saturation temperature value is actually needed for valve control purposes. A thermocouple, also in the steam trap monitors actual temperature. The example processing unit compares actual measured temperature against a pre-set sub-cooling temperature below the calculated saturation temperature.

If the measured temperature is lower than the calculated sub-cooling temperature, condensate must be present at the steam trap inlet side. The processing unit then signals a valve actuating module to open the valve. Once the condensate is released (e.g., when calculated saturation temperature equals or is only slightly below measured temperature), the processing unit closes the valve.

A continuous regulating mode is also possible. In an example continuous regulating mode, a desired pre-set sub-cooling temperature (a temperature lower than the calculated saturation temperature by a pre-set incremental sub-cooling temperature value) can be set, e.g., by an operator. When the system pressure changes or fluctuates, the absolute opening and closing temperature changes but the degree of sub-cooling corresponding to the saturation temperature is held substantially constant in this example.

The processing module is connected to or contains a conventional wireless digital data communication module that transfers information about the steam trap (e.g., its GPS data), status of the steam trap and its measured values to a receiver that may be remotely located.

Turning back to FIG. 1, the electronic steam trap includes a drain pipe 110 along which condensate may accumulate and pass. Drain pipe 110 has an inlet 114 and an outlet 116. A thermo-electric generator (TEG) 120 is mounted in thermal communication with (e.g., above and in clamped contact with the pipe 110 in this depicted example) an upstream section of drain pipe 110 (i.e., upstream of a condensate discharge valve unit 118—although those in the art will appreciate that the physical arrangement can be varied so long as the "hot" side of TEG 120 is in thermal communication with any desired portion of the "hot" drain pipe 110).

An electronic control unit 122 is mounted above TEG 120 providing room above the TEG to facilitate cooling of the "cold" portion of the TEG—and also providing an integrated, separable and self-sufficient monitoring and control module 130. That is, the electronic monitoring and control module 130, including sensors, TEG and configured electronic processor (e.g., an ASIC or CoC or programmed micro-computer, digital memory storage, input/output ports, etc) may be configured as a separate module from the valve actuation portion or module 118. This allows a modularly built system and utilization of perhaps just monitoring portion 130 in critical parts of a steam system. It also permits the monitoring and control module to be easily removed and located remotely in some installations.

A valve module 118 includes a condensate discharge valve 220 (FIG. 3) installed in a downstream section of drain pipe 110 at its outlet. An electro-mechanical actuator unit (e.g., motor drive unit 140) is operatively disposed to drive valve 220 between open and closed positions. The actuator unit can use any suitable electrically controlled mechanical actuator for valve 220, e.g., rotational electrical motors such as a stepping motor (especially useful for a regulated valve opening mode), electrically actuated linear motors such as an electro-magnetic solenoid, electrically controlled pneumatic forces, hydraulic forces, etc.

Figure 3:
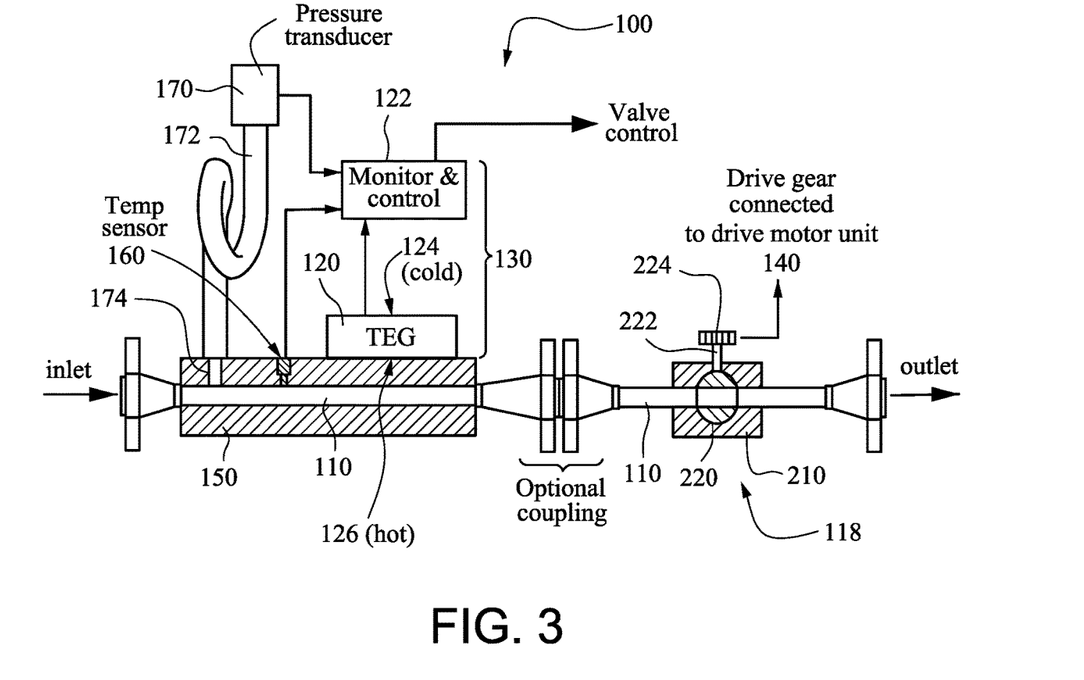
FIG. 3 is a schematic illustration of a cross-section of the steam trap system of FIG. 1.

Drain pipe 110 may extend through housing 150, as shown in FIG. 3. As also shown in FIG. 3, a coupling joint may be provided in drain pipe 110 between the monitoring and control module 130 and the valve module 118 to facilitate modular construction/installation/utilization features. A pressure sensor 170 is fluidly connected to an internal passageway of drain pipe 110 via passageway 174 which extends through housing 150 and tubing 172 for measuring pressure in the internal passageway of the drain pipe. Pressure sensor 170 may be a piezoelectric sensor or any other suitable pressure sensor or transducer that provides an electrical signal representing pressure. The pressure measuring transducer may be located locally at passageway 174 or remotely, e.g., within the control unit 130 if, for example, the internal pressure condition within the upstream portion of the drain pipe is fluidly connected by a conduit 172 to a remote transducer in the control unit.

A temperature sensor 160 (e.g., a thermocouple or any other conventional temperature sensor that provides an electrical signal representing temperature) may be directly (or indirectly) exposed to the internal upstream passageway of drain pipe 110 to measure temperature in the drain pipe passageway 110. For example, temperature sensor 160 may be disposed in housing 150 and provide an electrical output signal to control circuitry 122.

The pressure measurement from sensor 170 is used to calculate the current corresponding steam saturation temperature (or a pre-set sub-cooling incremental offset therefrom) which may be compared to the actual measured temperature. Locating the pressure measurement sensor 170 within the steam trap housing allows the electronic steam trap to work at any pressure within the mechanical limits of the housing. The steam/condensate liquid/gas phase saturation curve temperature/pressure data is well known to those in the art (e.g., see the solid graph line in FIG. 8) and is stored as predetermined data stored (e.g., as a table of values) within a memory portion of the computerized control unit 130 and is thus predetermined and available for such comparison purposes.

The valve 220 may be configured to be automatically opened by control unit 130 when the measured temperature is below the calculated saturation temperature by the pre-set sub-cooling temperature amount (e.g., see the dashed valve opening graph line in FIG. 8). This pre-set sub-cooling incremental off-set value ΔSC may be adjusted and/or programmed into the control unit 130 by a user in some example embodiments where the control unit 130 can be, or is, connected to an operator input and display device (e.g., an operator GUI input/output touch-sensitive display screen incorporated directly into the control unit 130 or a lap-top computer having a keyboard and/or other GUI input/output capability connected temporarily to the control unit 130 via a USB cable or the like).

In a cycling mode, the control unit is configured to automatically open the valve at a measured temperature value T below the calculated saturation temperature ST (i.e., the sub-cooling temperature SC=ST−ΔSC) and to automatically close the valve when measured temperature T is at or only slightly below saturation temperature ST.

In a continuous regulation mode, the valve is automatically incrementally moved toward an open position by control unit 130 if the measured temperature T is below the calculated saturation temperature ST offset by ΔSC (i.e., if T is less than SC) and automatically incrementally moved toward a closed position by control unit 130 if the measured temperature T is above the calculated saturation temperature ST offset by ΔSC (i.e., if T is greater than SC). As those in the art will realize, for stable operation some amount of hysteresis will be imposed so that the measured temperature T is maintained within a narrow range of SC (e.g., within 5° C.). Here the degree of opening is regulated (and therefore the flow of discharged condensate is regulated) so as to hold the measured temperature at a substantially constant sub-cooling value. The flow of discharged condensate can vary depending on system conditions. An approximately constant degree of sub-cooling can be maintained by varying the valve opening and hence regulating the flow of condensate.

In an alternative example, ultrasonic sensors also may be disposed to monitor condensate presence in the drain pipe, possibly at multiple locations, to determine whether condensate is in the drain pipe at these locations and thus provide alternate or additional control inputs to insure valve opening if the presence of actual liquid condensate is detected at one or more particular locations. The use of ultrasonic sensors to sense fluid presence or absence is well known in the art and thus no additional description is believed necessary.

TEG 120 is disposed in thermal contact with housing 150, as depicted in FIG. 3. As those in the art will appreciate, the TEG 120 may be disposed at any angular or other disposition with respect to the drain pipe 110 so long as its "hot" side is in thermal communication with the drain pipe 110. That is, the hot side 126 of TEG 120 is positioned to thermally engage housing 150 while a "cold" side 124 is oriented towards a lower ambient temperature (e.g., Seebeck elements are disposed between the hot side and cold side of TEG 120). In one example configuration of TEG 120, four TEGpro™ type TE-MOD-22W7V-56 elements can be utilized.

In this manner, steam in the drain pipe functions to heat the hot side of TEG 120. The example electronic steam trap is battery powered but with TEG 120 continuously maintaining battery charge. The system may also include one or more capacitors to store electrical energy (e.g., even in lieu of the battery if desired) and power the system. Electrical energy generated by TEG 120 is preferably used to charge the battery and/or capacitors. Such electrical energy storage devices can be considered as part of a TEG power source.

As shown in FIG. 1, the electronic monitoring and control module 130 may be disposed spaced apart (e.g., above) TEG 120 to allow sufficient ambient air cooling (e.g., via heat sinks, fans, etc.) at the cold side 124 of TEG 120. It will be recognized that the electronic monitoring and control module 130, if separable, may be disposed at any other suitable, possibly remote, location.

Referring to FIG. 3, valve module 118 may be installed upstream of the outlet of drain pipe 110. The valve module optionally may be configured as separable from the electronic monitoring and control module 130 (e.g., see the depicted optional pipe coupling situated at a mid-point along drain pipe 110). The valve module 118 may include a rotatably-operated valve 220 (e.g., a ball valve) configured to be actuated by a rotating electric motor unit 140 (e.g., a conventional geared motor with a feedback loop for positioning or a stepping electric motor) via a rotatable valve stem 222 and rotatable drive gear 224 (or other suitable valve driving connector, e.g., a belt drive, gears, linearly moving electrical, electro-mechanical solenoids or pneumatic/hydraulic motors and the like for linearly operated slide valves or the like).

In an open position, valve 220 opens the internal passageway of the drain pipe allowing condensate to flow past the valve outlet and in a closed position the valve closes the internal passageway of the drain pipe preventing fluid from flowing past the valve outlet. Of course intermediate valve positions effect a slower flow discharge rate.

A feedback system to control unit 130 is preferably used to control and/or monitor and/or report valve position (e.g., wirelessly to a remote location). For example, electrical switches may be mounted at predetermined locations and actuated thereat by movement of a valve operating gear or other valve driving mechanism. The current step position of a stepping motor may also be detected and monitored. Such valve position monitoring arrangements are well known in the art and need not be further described.

Figure 4:
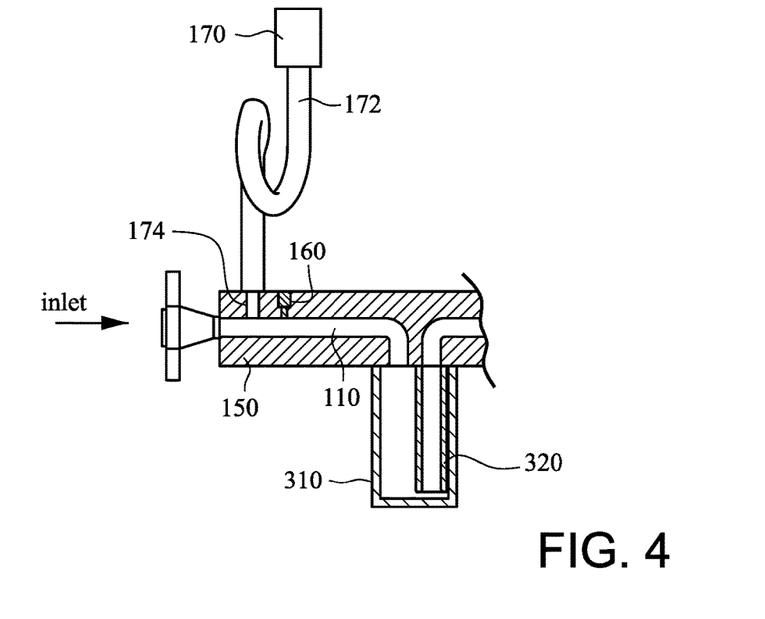
FIG. 4 is a partial schematic illustration of a cross-section of a steam trap system in accordance with another example of the disclosed technology.

In an alternative example shown in FIG. 4, the steam trap 100 includes a condensate pocket 310 and straw 320 which allows for accumulation of condensate and hence fewer cycles of releasing condensate.

Figure 5:
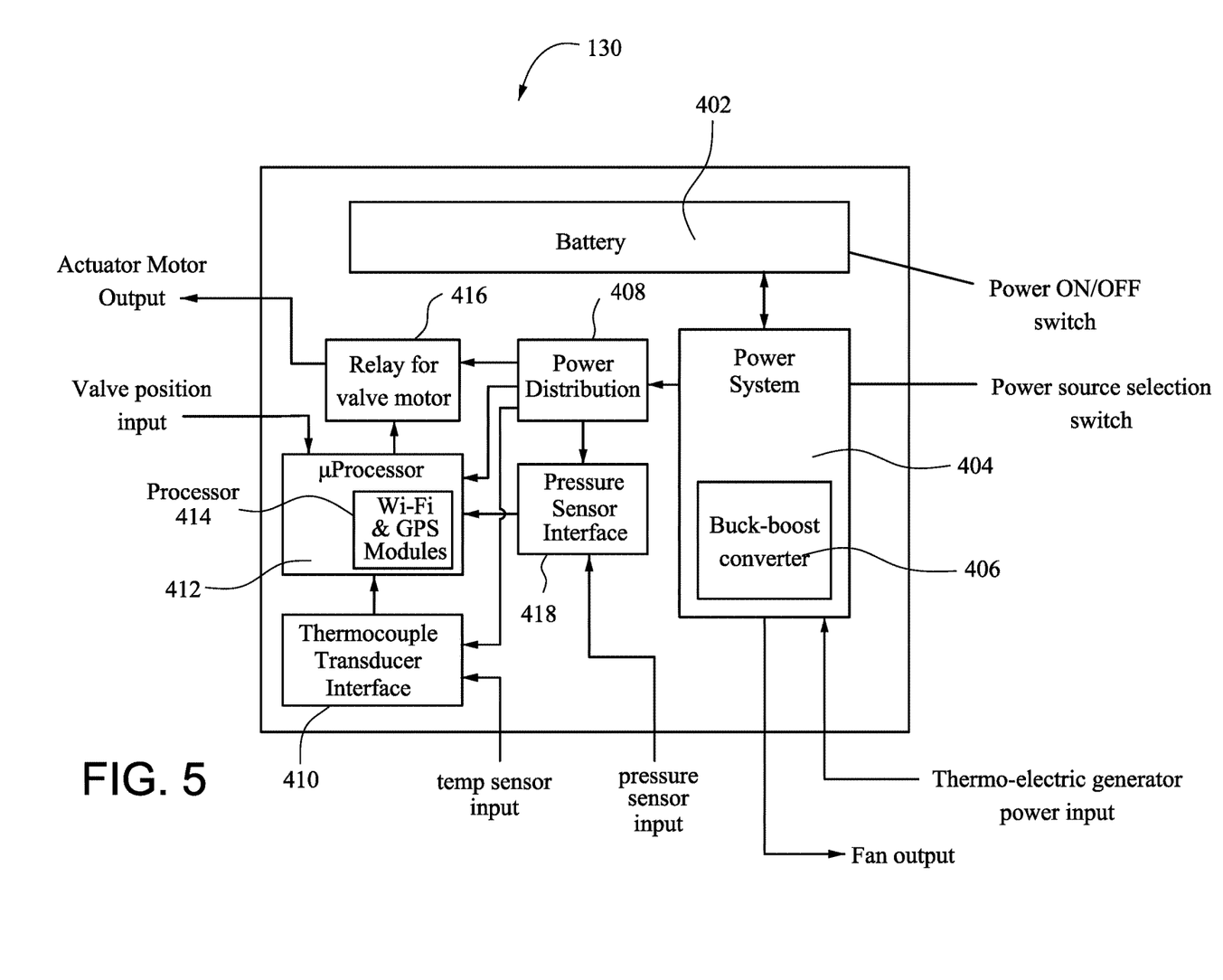
FIG. 5 is schematic representation of a control unit in accordance with an example of the disclosed technology.

Turning to FIG. 5, a schematic representation of an example monitoring and control circuit 122 is shown. The example control circuit contains a programmable microprocessor 412 and related memory as well as input/output ports which, in association with stored computer controlling program modules, regulate power, control the actuated valve, make calculations and comparisons (e.g., calculating the saturation temperature ST based on measured pressure P and comparing the corresponding sub-cooling temperature SC to actual measured temperature T), and accepting electrical inputs from the pressure and temperature sensors.

The internal power system 404 preferably includes a conventional buck-boost converter 406 to regulate voltage (s) supplied to other components such as power distribution unit 408 which distributes suitable electrical power to actuate the relay 416 and to power a relay-controlled motor (or alternately an electric motor configured for control by use of a MOSFET switch or PWM drive signal or the like as will be apparent to those in the art), to micro-processor 412, thermocouple transducer interface 410, and pressure sensor interface 418. The control unit/power system may also be considered to include battery 402 or energy storage capacitors or a combination of both.

A Wi-Fi module 414 (or Bluetooth module or the like to effect wireless communication of status/control data to/from the control unit 130) and a GPS sensor (to generate GPS valve location data for local storage and/or wireless transmission to a remote steam trap monitoring site) are preferably included either as components communicating with input/output ports of processor 412 or residing within an application specific integrated circuit (ASIC) or other electronic digital data processor (e.g., a computer on a chip (CoC)). The steam trap 100 can thereby send status data and measured values to a remote monitoring location (e.g., temperature T, pressure P, current operating and location statuses, etc., via Wi-Fi, Bluetooth, mobile network, or any other desired wireless data transmission channel).

The automated electronic steam trap 100 may operate in several different powered modes. For example, in a thermoelectric mode TEG 120 is present and configured to charge a battery and/or capacitor during operation. In an autarkic (i.e., self-sufficient) mode the system might run on battery only. In an external mode the system can be supported and charged by an external power source.

Figure 6:
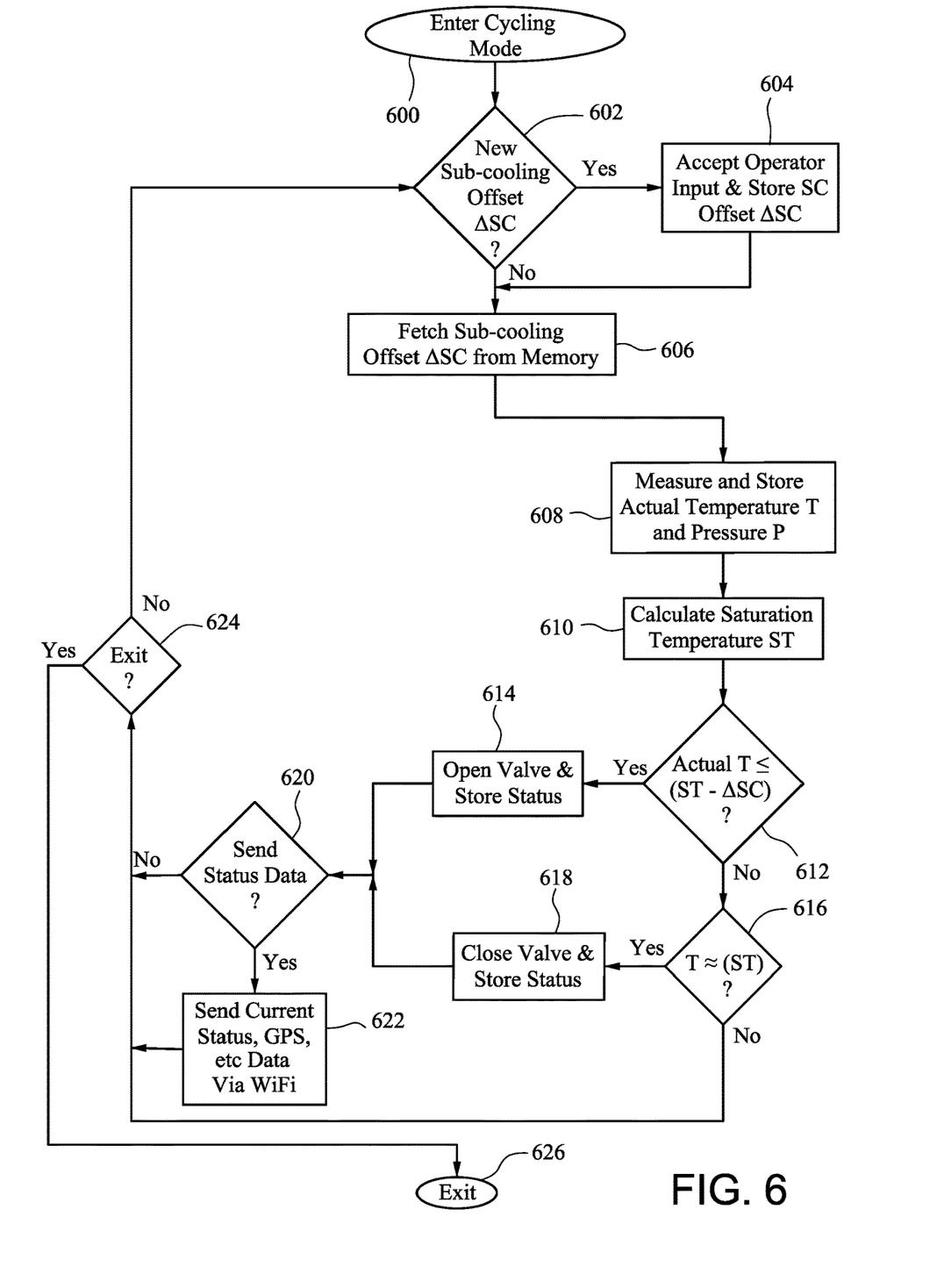
FIG. 6 is a functional block diagram representing an exemplary control program/process executed by the control unit of FIG. 5.

Referring to FIG. 6, a functional block diagram representing an example control program/process executed by the example monitoring and control module 130 is shown. As those in the art will appreciate, a conventional over-arching operating system (OS) may be used to achieve basic boot-up and computer operating functions, including a graphical user interface (GUI) to appear on a display screen of the module 130 and/or on a display screen of a temporarily connected lap-top computer, for example. From this over-arching OS different operational modes may be selected and entered and executed. FIG. 6 schematically depicts an example cycling mode of operation.

The cycling mode is entered at 600. An opportunity for entering a new sub-cooling incremental offset temperature ΔSC is provided at decision block 602. If such is desired (e.g., as indicated by an operator command, then such is accepted and stored at 604). It should be appreciated that the input sub-cooling offset ΔSC may be a single fixed temperature value (to be subtracted from a calculated saturation temperature ST) or a functional relationship that establishes a varying sub-cooling offset value at different saturation temperatures.

Control is then passed to block 606 where the current sub-cooling offset ΔSC is retrieved from memory. Then, at 608, the actual current temperature T and pressure P is measured and stored. At block 610, the current saturation temperature ST is calculated and stored. Then at decision block 612 the sub-cooling temperature SC (i.e., the calculated saturation temperature ST less the applicable sub-cooling offset (i.e., SC=ST−ΔSC)) is compared to the measured actual temperature T. If the actual temperature T is equal to or less than SC, then at block 614 the valve is opened (if not already in an open status). At decision block 616, the saturation temperature ST is compared to the actual temperature T. If T is equal to or slightly less (e.g., by 5° C.) than ST, the valve is closed at 618 (if not already in a closed status). If T is greater than ST (or greater than a 5° C. offset less than ST), control is passed to decision block 624 to determine if an exit from this cycling mode is desired. If so, then the cycling mode program is exited at 626. If not, control is passed back to decision block 602 to initiate another control cycle.

After a valve opening or valve closing action at 614 or 618, a test is made at decision block 620 to see if a request has been made to transmit status data, e.g., to a remote monitoring site via a WiFi or other communication channel. If so, then current status data (e.g., valve status, T, P, ST, SC, GPS location data, etc) is sent as requested at block 622. Then control is passed to the "exit?" decision block 624. If exit of this cycling mode has not been requested, then control is passed back to decision block 602 to initiate another control cycle. If an exit has been requested, then this control program module is exited at 626.

As will be appreciated, if more frequent transmission of current status data is desired, then decision block 620 can also be entered from the "No" decision at block 616 so that status data is sent at each cycle repetition. And if status data is only desired at periodic intervals, then a timer control can be added to the decision block 620 so as to only permit sending of status data at predetermined intervals. And if status data is only desired when requested, then decision block 620 can be modified so as to condition the sending of status information on the existence of a currently unsatisfied request for sending status data (which request can be remotely generated and sent to the control module 130 via an established digital signal communications link).

Figure 7:
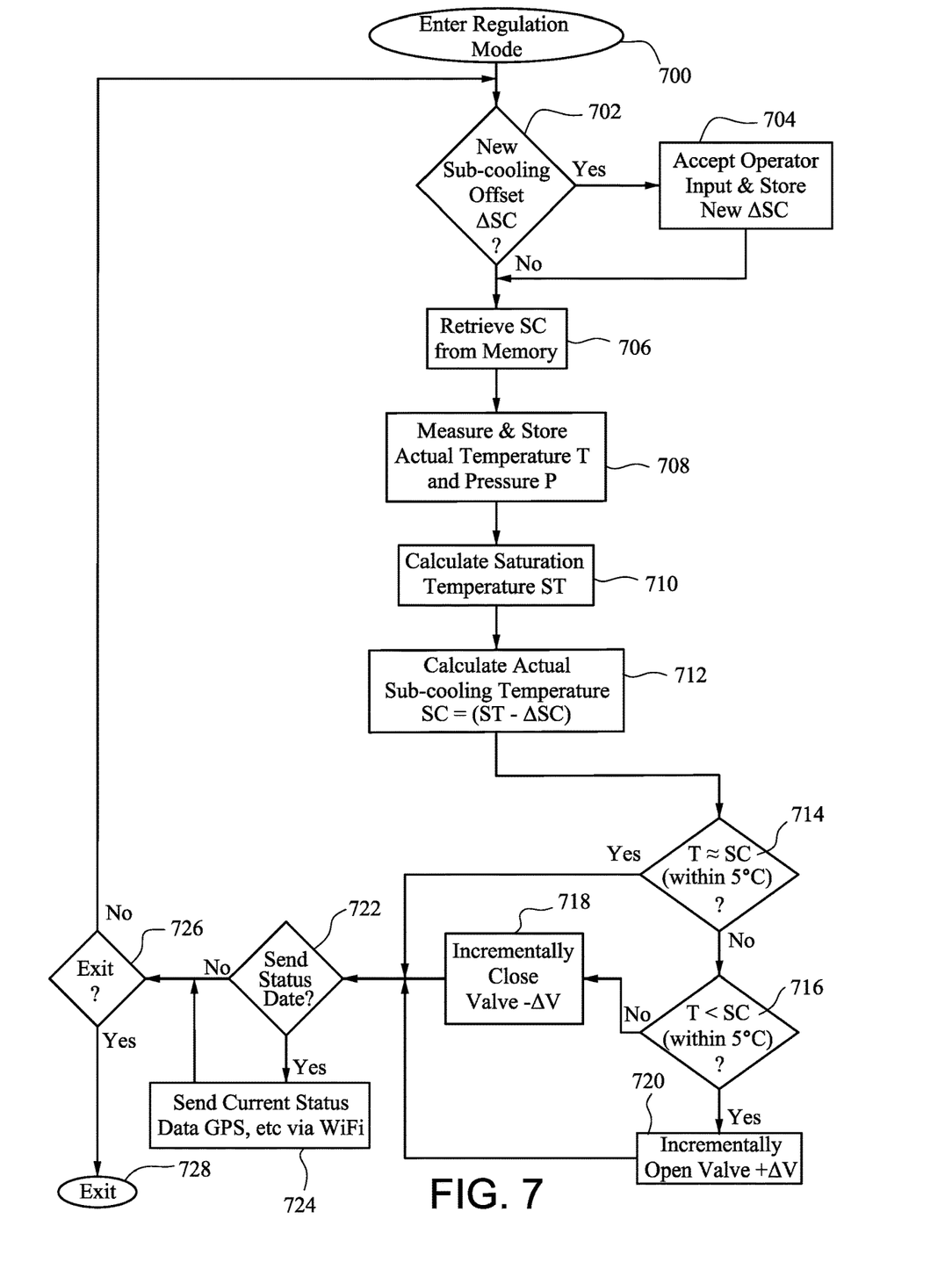
FIG. 7 is a functional block diagram representing an exemplary control program/process executed by the control unit of FIG. 5.

Referring to FIG. 7, a schematic functional block diagram representing an example continuous regulation control mode is depicted. In continuous regulation mode, the valve (e.g., ball valve 220) is regulated to a degree of opening so that a regulated flow of condensate is assured by holding the level of sub-cooling at the inlet constant (i.e., by regulating the discharge valve opening).

The regulation mode is entered at 700. A test is made at 702 to see if a new sub-cooling incremental offset value ΔSC is desired. If so, then such input is accepted and stored at 704. As noted previously, it is possible that more than just a single sub-cooling off-set value is entered (e.g., if a functional relationship between the desired sub-cooling offset and a temperature or pressure variable is desired).

At block 706, the applicable sub-cooling offset value ΔSC is retrieved from memory. At 708, the actual temperature T and pressure P values are measured and stored. At 710, the saturation temperature ST is calculated and at 712 the current sub-cooling temperature SC=(ST−ΔSC) is calculated. A desired substantially constant offset is likely to be a bandwidth rather than an exact value. For example, the desired sub-cooling SC may be between +/−5° C. of ST in the simplified equations here presented.

At decision block 714 a test is made to see if the sub-cooling temperature SC=(ST−ΔSC) is substantially equal to the measured temperature T (e.g., within 5° C.). If so, then control is passed to decision block 722 for the possible sending of status data. If not, then control is passed to decision block 716 to see if the measured temperature T is substantially less than the sub-cooling temperature SC (e.g., outside of +/−5° C.). If so, the valve is incrementally opened by a +ΔV amount at 720. If not, then the valve is incrementally closed by a −ΔV amount at 718. As should be appreciated, this will result in the level of actual sub-cooling temperature SC being held substantially constant.

After incremental valve control has been effected, control is also passed to decision block 722 to see if the sending of status data has been requested. If so, then the current status data (e.g., valve status, T, P, ST, SC, GPS location data, etc) is sent via a desired communication channel (e.g., WiFi) at block 724. If not, and/or after sending status data at 724, control is passed to decision block 726 to see if an exit from this mode of operation has been requested. If so, then this control mode program is exited at 728. If not, then control is passed back to decision block 702 to initiate another instance of regulation mode control.

As those in the art will appreciate, this regulation mode control will maintain the measured temperature T substantially equal to the desired sub-cooling temperature SC (e.g., within 5° C.). It should also be noted that, if desired, one or more ultrasonic transducers can be employed to detect and regulate the flow of condensate from the regulated valve. Ultrasonic sensing can also be used to detect whether there is condensate or steam flow present.

As with the cycling example mode, if status data is only desired at periodic intervals, then a timer control can be added to the decision block 722 so as to only permit sending of status data at predetermined intervals. And if status data is only desired when requested, then decision block 722 can be modified so as to condition the sending of status information on the existence of a currently unsatisfied request for sending status data (which request can be remotely generated and sent to the control module 130 via an established digital signal communications link).

Figure 8:
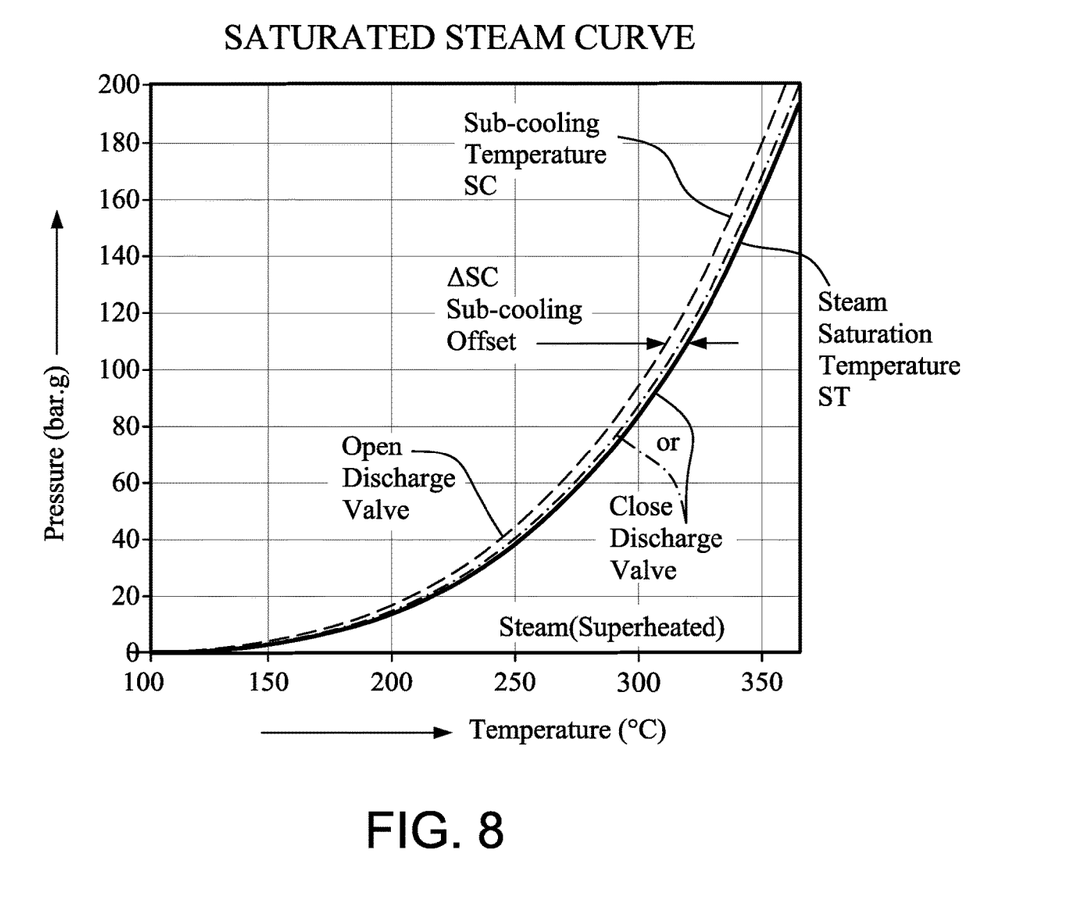
FIG. 8 is a schematic annotated diagram of a traditional saturated steam curve showing the pressure and temperature at which water exists as steam or as liquid condensate and has superimposed thereon an example of discharge valve opening and closing curves which are, in this one example, horizontally offset from the saturated steam curve.

An annotated saturated steam curve is schematically depicted in FIG. 8. Here the solid graph line represents the well-known steam saturation curve depicting water pressure and temperature variables defining a locus of pressure/temperature values where water changes from a gaseous steam phase to a liquid condensate phase. The dashed graph line (horizontally offset to the left of the solid saturation steam temperature curve) represents a sub-cooling temperature SC off-set by −ΔSC degrees below the saturation temperature ST. As described in the above examples, the discharge valve is opened at temperature SC (and below) and the discharge valve is closed at temperatures ST (or slightly below). In an example embodiment, the close discharge valve curve is thus also horizontally offset slightly to the left in FIG. 8 (e.g., see the optional dot-dash curve in FIG. 8) from the saturated steam curve so as not to let any steam escape (e.g., to close the discharge valve 5° C. before saturation temperature ST is reached as schematically depicted in FIG. 8).

The example steam trap structures described above provide closely situated condition measuring points (i.e., for temperature and pressure) and regulation (e.g., by operation of the discharge valve) in one self-contained compact unit. This allows well regulated draining of condensate (and steam of pre-determined conditions if desired) by installation of a self-contained relatively small unit at virtually any desired point in an existing or newly constructed steam system.

Basically there is a pressure derived/calculated steam saturation temperature. In relation to the calculated saturation temperature, there is a closing temperature and there is an opening temperature, with closing temperature being greater than opening temperature. Both opening/closing temperatures can be below the calculated saturation temperature or above the calculated saturation temperature—or one can be below and one above the calculated saturation temperature curve.

As will be appreciated by those in the art, if an example steam trap is used in superheated steam systems, the opening and closing discharge valve operations can be triggered at temperatures above the steam saturation temperature.

While the examples discussed above have been described in connection with what are presently considered to be practical and preferred features, it is to be understood that appended claims are intended to cover modifications and equivalent arrangements included within the spirit and scope of these examples.

What is claimed is:

1. An automated electronic steam trap comprising:
   a steam trap having an internal passageway connected between an inlet port configured to receive steam/condensate and an outlet port configured to discharge condensate collected by the steam trap;
   a condensate discharge valve disposed at or upstream of the outlet port for venting condensate from the steam trap when actuated to an open position;
   pressure and temperature sensors disposed to monitor pressure and temperature conditions in the internal passageway upstream of the condensate discharge valve; and
   an electronic control processing circuit configured to automatically actuate said valve in response to inputs from the pressure and temperature sensors,
   wherein said electronic control processing circuit is configured to effect a regulation mode wherein said condensate discharge valve is regulated to a partially open position by:
   (a) incrementally opening the valve if the measured temperature is less than the calculated steam saturation temperature offset by a predetermined sub-cooling increment, and
   (b) incrementally closing the valve if the measured temperature is more than the calculated steam saturation temperature offset by a predetermined sub-cooling increment, thereby regulating condensate flow from said discharge valve by regulating the measured temperature to a constant temperature.

2. The automated electronic steam trap of claim 1 wherein said electronic control processing circuit is configured to effect a cycling mode wherein a steam saturation temperature is calculated based on the measured pressure and, in relation to the calculated saturation temperature, said condensate discharge valve is:
   (a) placed in a fully open position at a first measured temperature offset from the calculated saturation temperature, and
   (b) placed in a fully closed position at a second measured temperature at or offset from the calculated steam saturation temperature, wherein said valve closing second measured temperature is greater than said valve opening first measured temperature.

3. The automated electronic steam trap of claim 1 further comprising: a wireless communication circuit configured to wirelessly transmit data indicating valve position to a remote location.

4. The automated electronic steam trap of claim 1, wherein said valve comprises a valve operation mechanism driven by a rotatably moving electrical motor.

5. The automated electronic steam trap of claim 1, wherein said valve comprises a valve operation mechanism driven by a linearly moving electrical motor.

6. The automated electronic steam trap of claim 1, wherein said valve comprises a valve operation mechanism driven by an electrically actuated pneumatically or hydraulically powered movement mechanism.

7. The automated electronic steam trap of claim 1, further comprising; a GPS (global positioning satellite) sensor configured to provide steam trap location GPS data to a wireless communication circuit configured to wirelessly transmit such GPS data to a remote location.

8. The automated electronic steam trap of claim 1 further comprising: a thermoelectric generator (TEG) power source disposed in thermal communication with the steam trap and configured to power said electronic control processing circuit by generating electrical power from heat energy of steam/condensate passing into said inlet port; wherein said TEG power source powers comprises a battery and/or capacitor electrical energy storage device configured to be charged with electrical energy from a TEG.

9. The automated electronic steam trap of claim 8, wherein said TEG power source comprises a voltage regulator configured to regulate a voltage supplied by the TEG to charge said electrical energy storage device.

10. The automated electronic steam trap of claim 1, wherein said condensate discharge valve and an associated valve driving mechanism are disposed in a first separable module that is separable from the electronic control processing circuit which is housed in a second separable module, the first separable module and the second separable module being joined or separated at an intervening connection joint of the internal passageway.

11. A method of automatically draining condensate from a heated fluid/gas line, the method comprising:
   providing a drain pipe configured to be placed in fluid communication with a heated fluid/gas line and having an internal passageway configured to accumulate liquid condensate therein, said drain pipe having an inlet port configured to receive gas/condensate and an outlet port configured to discharge condensate collected by the drain pipe via a condensate discharge valve disposed at or upstream of the outlet port for venting condensate when actuated to an open position;
   measuring pressure in the internal passageway of the drain pipe with a pressure sensor that is in fluid communication with the drain pipe internal passageway;
   calculating saturation temperature of the gas based on the measured pressure;
   measuring temperature in the internal passageway of the drain pipe with a temperature sensor; and
   automatically actuating the condensate discharge valve in response to the calculated saturation temperature and measured temperature, wherein said automatically actuating is configured to effect a regulation mode wherein said condensate discharge valve is regulated to a partially open position by:
(a) incrementally opening the valve if the measured temperature is less than the calculated saturation temperature offset by a predetermined sub-cooling increment, and
(b) incrementally closing the valve if the measured temperature is more than the calculated saturation temperature offset by a predetermined sub-cooling increment, thereby regulating condensate flow from said discharge valve by regulating the measured temperature to a substantially constant temperature.

12. The method of claim 11 wherein the automatically actuating step is configured to effect a cycling mode wherein a gas saturation temperature is calculated based on the measured pressure and, in relation to the calculated saturation temperature, said condensate discharge valve is:
(a) placed in a fully open position at a first measured temperature offset from the calculated saturation temperature, and
(b) placed in a fully closed position at a second measured temperature at or offset from the calculated steam saturation temperature, wherein said valve closing first measured temperature is greater than said valve opening second measured temperature.

13. The method of claim 11, further comprising manually adjusting a predetermined sub-cooling increment amount to a different predetermined value upon receiving a commanded manual input.

14. The method of claim 11, further comprising actuating an electrical motor to position the valve to different open/closed positions.

15. The method of claim 14, further comprising: electrically powering the electric motor and a controlling electronic control processing circuit with electrical energy stored in an electrical energy storage device that is charged by a thermoelectric generator in thermal communication with the drain pipe.

16. The method of claim 15 wherein said electrical energy storage device comprises a battery.

17. The method of claim 15 wherein said electrical energy storage device comprises a capacitor.

18. The method of claim 11, further comprising wirelessly transmitting drain pipe status information including at least one of: measured temperature, measured pressure, calculated saturation temperature, a currently active incremental sub-cooling value, current valve position, and GPS location data.

* * * * *